US012725056B2

(12) United States Patent
Mitra et al.

(10) Patent No.: US 12,725,056 B2
(45) Date of Patent: Sep. 1, 2026

(54) GENERATING MACHINE LEARNING BASED MODELS FOR TIME SERIES FORECASTING

(71) Applicant: Humana Inc., Louisville, KY (US)

(72) Inventors: Sayantan Mitra, Louisville, KY (US); Nibhrat Lohia, Louisville, KY (US); Peyman Yousefian, Frederick, MD (US); Harpreet Singh, Louisville, KY (US); Rajiv Kumar Gumpina, Louisville, KY (US)

(73) Assignee: Humana Inc., Louisville, KY (US)

( * ) Notice: Subject to any disclaimer, the term of this patent is extended or adjusted under 35 U.S.C. 154(b) by 1212 days.

(21) Appl. No.: 17/469,598

(22) Filed: Sep. 8, 2021

(65) Prior Publication Data

US 2023/0075453 A1 Mar. 9, 2023

(51) Int. Cl.
*G06N 5/04* (2023.01)
*G06F 16/28* (2019.01)
*G06N 5/022* (2023.01)

(52) U.S. Cl.
CPC ............ *G06N 5/04* (2013.01); *G06F 16/285* (2019.01); *G06N 5/022* (2013.01)

(58) Field of Classification Search
CPC ........... G06N 5/022; G06N 5/04; G06N 3/09; G06N 3/0442; G06F 16/285
See application file for complete search history.

(56) References Cited

U.S. PATENT DOCUMENTS 10,318,874 B1 * 6/2019 Duncan ................. G06N 20/00
10,770,184 B1 * 9/2020 McNair ................. G16H 50/70
10,832,196 B2 * 11/2020 Oliveira Almeida .. G06N 20/00
11,126,927 B2 * 9/2021 Stefani .................. G06N 20/00
(Continued)

FOREIGN PATENT DOCUMENTS

WO WO-2021101594 A1 * 5/2021 ............ G06N 3/126

OTHER PUBLICATIONS

Date, S., "Holt-Winters Exponential Smoothing," Jul. 27, 2020, 21 pages, [Online] [Retrieved on Nov. 12, 2021] Retrieved from the Internet <URL: https://towardsdatascience.com/holt-winters-exponential-smoothing-d703072c0572>.
Hyndman, R.J. et al., "7.1 Simple exponential smoothing: Forecasting: Principles and Practice (2nd ed)," Apr. 2018, eight pages, [Online] [Retrieved on Nov. 12, 2021] Retrieved from the Internet <URL: https://otexts.com/fpp2/ses.html>.
(Continued)

*Primary Examiner* — Mariela Reyes
*Assistant Examiner* — Evel Honore
(74) *Attorney, Agent, or Firm* — Standley Law Group LLP; Jeffrey S. Standley; James L. Kwak

(57) ABSTRACT

A system according determines a machine learning based model for forecasting time series data for a given use case. The system determines a model metric for a specific use case of time series data. The system accesses a pool of machine learning based models including a plurality of machine learning based models machine learning based models based on different machine learning techniques. For each of the plurality of machine learning based models the system performs forecasting using the machine learning based model and determines the value of the model metric for the machine learning based model. The system selects a machine learning based model based on comparison of values of the model metric for machine learning based models. The system uses the selected machine learning based model for forecasting values for the time series data for the application.

6 Claims, 9 Drawing Sheets

(56) References Cited

U.S. PATENT DOCUMENTS

| | | | | |
|---|---|---|---|---|
| 11,531,917 | B1 * | 12/2022 | Gasthaus | G06N 3/09 |
| 11,783,006 | B1 * | 10/2023 | Prieditis | G16H 50/30 702/1 |
| 12,293,286 | B2 * | 5/2025 | Wu | G06N 3/044 |
| 2018/0275314 | A1 * | 9/2018 | Pavlovski | G01W 1/12 |
| 2022/0108335 | A1 * | 4/2022 | Kaveetil | G06Q 10/04 |
| 2022/0129747 | A1 * | 4/2022 | Cetintas | G06N 3/08 |
| 2022/0253426 | A1 * | 8/2022 | Zhu | G06N 3/044 |
| 2022/0329328 | A1 * | 10/2022 | Paulraj | H04B 17/11 |
| 2022/0383433 | A1 * | 12/2022 | Moton, Jr. | G06Q 50/12 |

OTHER PUBLICATIONS

Mavuduru, A., "How to use Facebook's NeuralProphet and why it's so powerful," Dec. 16, 2020, 19 pages, [Online] [Retrieved on Nov. 12, 2021] Retrieved from the Internet <URL: https://towardsdatascience.com/how-to-use-facebooks-neuralprophet-and-why-it-s-so-powerful-136652d2da8b>.

Ng, E. et al., "Orbit: Probabilistic Forecast with Exponential Smoothing," arXiv:2004.08492v4, Jan. 22, 2021, pp. 1-6.

Prabhakaran, S., "ARIMA Model—Complete Guide to Time Series Forecasting in Python," Aug. 22, 2021, 46 pages, [Online] [Retrieved on Nov. 12, 2021] Retrieved from the Internet <URL: https://www.machinelearningplus.com/time-series/arima-model-time-series-forecasting-python/>.

* cited by examiner

Pool of Models
610
620a
620b
620c
620d
620e
3
3
4
20
4
Trained Models
630

Pool of Top Models
640
650a
650b
650c
650d
650e
3
3
4
20
4
Trained Optimized Models
660

GENERATING MACHINE LEARNING BASED MODELS FOR TIME SERIES FORECASTING

BACKGROUND

The disclosure relates to time series forecasting in general and more specifically to generating machine learning based models for time series forecasting.

Time series data is generated by various systems and may represent different types of data including machine usage, user actions, sensor data, and so on. For example, time series data may represent computer network usage, storage usage, processor utilization, memory utilization, application performance, and so on. Time series data may be received from sensors, for example, in IoT (internet of things) based systems. Time series data may also represent user actions, for example, user interactions performed with an online system over time or user actions performed in real world that may be monitored by a system. Analysis of time series data often includes forecasting future values of the time series based on historical data. Forecasting of time series data may be used for predicting potential issues with a system providing the underlying time series data. For example, if the time series data represents computer network usage, the time series forecasting may be used to predict potential network outages in advance.

Machine learning based models are used for forecasting of time series data. Examples of machine learning based models that may be used for analyzing time series data include linear regression, multi-layered perceptron neural networks, recurrent neural networks, long short-term memory (LSTM) neural networks, and so on. Due to the wide variety of machine learning based models available for processing time series data, developers find it difficult to select the best machine learning based model for time series forecasting for a specific application. Conventional techniques require extensive development effort and use of significant computational resources to train different machine learning based models and evaluate them to select the best model. For example, a typical use case may require developers to develop several thousand lines of code and spend weeks or even months evaluating various machine learning based models. This results in waste of human as well as computing resources. Furthermore, users are required to have extensive knowledge of machine learning techniques to be able to build a machine learning based model for a specific use case.

SUMMARY

A system according to an embodiment generates a machine learning based model for forecasting time series data for a given use case. The system receives information describing characteristics of an application of a time series data. The system determines a model metric based on the characteristics of the application. The model metric represents a criterion for evaluating machine learning based models. Examples of model metrics include, mean absolute percentage error, root mean square error, mean absolute error, mean squared error, and so on. In some embodiments, the system receives from a user, the model metric to be used for evaluation of the machine learning based models rather than the characteristics of the application.

The system accesses a pool of machine learning based models including a plurality of machine learning based models. The pool of machine learning based models include models based on various machine learning techniques, for example, simple exponential smoothing based models, double exponent smoothing based models (Holt models), triple exponent smoothing based models (Holt Winters models), autoregressive integrated moving average models (ARIMA models), additive regression models (Prophet models) and so on. For each of the plurality of machine learning based models the system performs forecasting and determines the value of the model metric for the machine learning based model. The system selects a machine learning based model based on comparison of values of the model metric for the different machine learning based models. The system uses the selected machine learning based model for forecasting values for the time series data for the application.

In an embodiment, the pool of machine learning based models includes multiple machine learning based models for each type of machine learning technique. The system selects a set of top machine learning based models, each top model selected from a set of machine learning based models using a particular machine learning based technique. The system selects the best machine learning based model for the application from the top machine learning based models.

The model selection is governed by the metric of choice which in turn depends on the use case; making the model selection process aligned with the specific goals of the application to achieve. In situations where a target metric definition is not provided by a user, a clustering based technique is used to identify most reasonable metric of choice for selecting time-series models.

In an embodiment, the system performs forecasting using the machine learning based model by determining a training data set based on the time series data. The training dataset includes a training subset and a test subset. The system trains the machine learning based model using the training subset of the training dataset and evaluates the machine learning based model using the test subset of the training dataset.

In an embodiment, the system determines a small training data set D1 and a large training dataset D2 based on the time series data. The small training data set D1 includes a training subset T11 and a test subset T12, the training data set D2 includes a training subset T21 and a test subset T22. The system trains each of the plurality of the machine learning based models using the small training dataset D1. The system determines a subset of the plurality of the machine learning based models based on evaluation of the plurality of the machine learning based models trained using the training dataset D1. The system trains each of the selected subset of the machine learning based models using the second training dataset. This allows the models to be generated efficiently by filtering a subset of machine learning based models using a small training dataset at first and next, using the large training dataset for the subset sequentially. Furthermore, this technique prevents overfitting of the model that is generated for the application.

In an embodiment, the system performs clustering of applications into categories. The clustering may be performed by generating a vector describing characteristics of the applications and using a distance metric to compare characteristics of the applications. Applications with similar characteristics are grouped into the same category of applications. The system stores a mapping from categories of applications to model metrics. A category of a particular application is determined based on characteristics of the particular application. The system determines the model metric by determining the category of the application based on the characteristics of the application and selecting the model metric associated with the determined category of the application.

The system determines categories of applications by receiving characteristics of each of a plurality of applications and clustering the plurality of applications based on the characteristics. Each cluster represents a category of applications. A new application is compared to the categories of applications and assigned a category that is determined to be most similar to the application. The model metric for the assigned category is used for the application.

The features and advantages described in the specification are not all inclusive and in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

DETAILED DESCRIPTION

Time series data comprises a sequence of datapoints (or data values) that are received over a period of time. Time-series data can be stationary or non-stationary. A stationary time series maintains constant mean and variance over time. A time series can have different attributes, for example, trend, seasonality, and error. For each attribute, there may be a great degree of variability in the time-series data. For example, trend may be linear or non-linear. A system according to various embodiments generates a machine learning based model for forecasting time series data for a particular application or use case.

Overall System Environment

Figure 1:
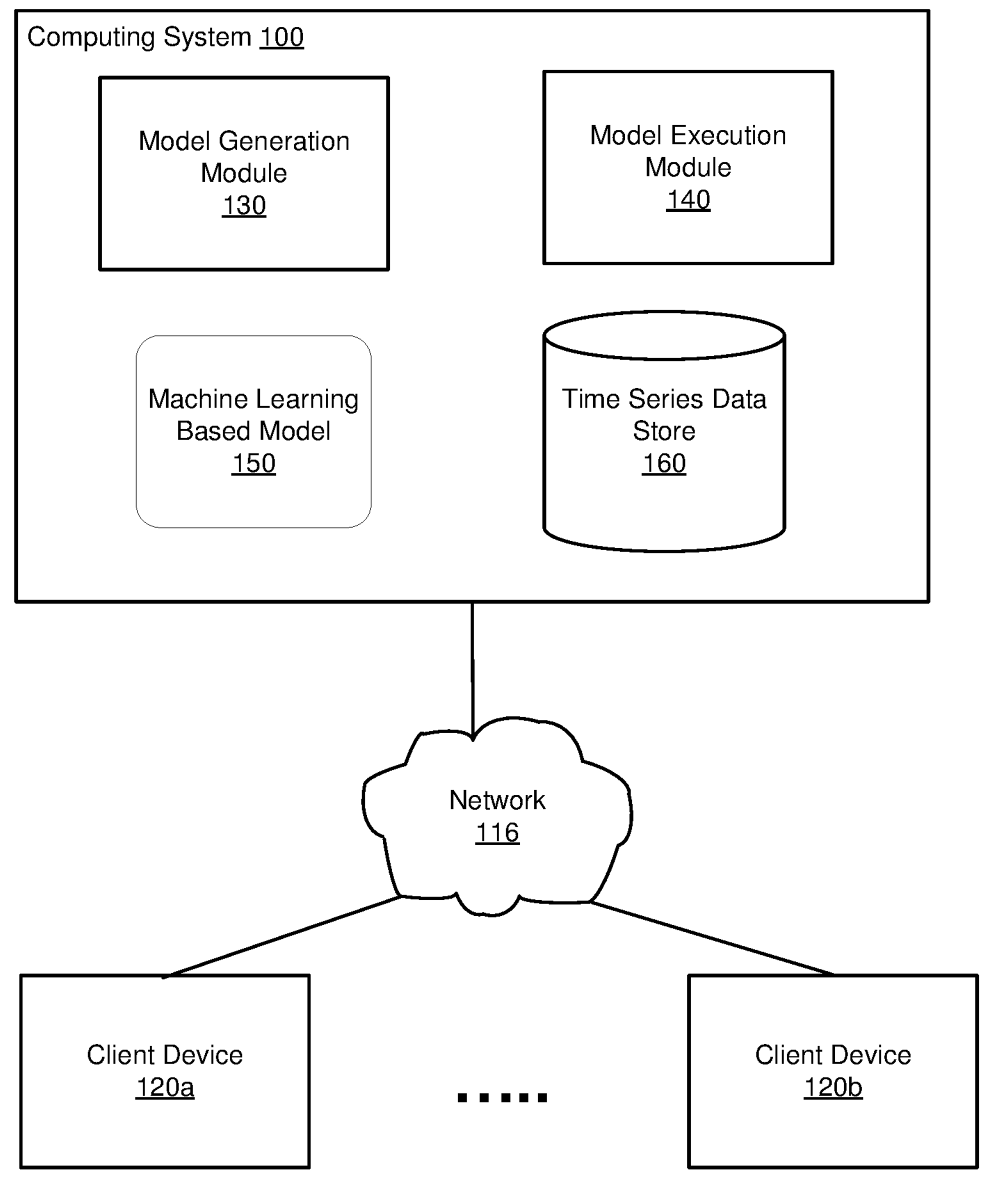
FIG. 1 shows the overall system environment of a system configured to generate machine learning models for time series forecasting and use them, according to an embodiment.

FIG. 1 shows the overall system environment of a system configured to generate machine learning models for time series forecasting and use them, according to an embodiment. The overall system environment 110 includes a computing system 100, a network 116, and one or more client devices 120. In other embodiments, more or fewer systems/components than those indicated in FIG. 1 may be used. A user may interact with the system 100 via the client device 120 through the network 116. Furthermore, there may be more or less instances of each system shown in FIG. 1, such as the client device 120.

The computing system 100 includes a model generation module 130, a model execution module 140, machine learning based model 150, and a time series data store 160. Other embodiments of the computing system 100 may include more or fewer modules. The computing system 100 uses machine learning based model 150 to forecast values of time series data, for example, time series data stored in the time series data store 160. The model generation module 130 generates the machine learning based model 150. The machine learning based model 150 may also be referred to herein as a model. The model execution module 140 loads and executes the machine learning based model 150. For example, an application may invoke the model execution module 140 to execute the machine learning based model 150. The application may forecast time series data and present the forecast values via a user interface that may sent via the network 116 for presentation via the client device 120.

The computing system 100 receives time series from one or more data sources and stores in the time series data store 160. For example, time series data may represent computer network usage, storage usage, processor utilization, memory utilization, application performance, and so on. Time series data may be received from sensors, for example, in IoT (internet of things) based systems. Time series data may also represent user actions, for example, user interactions performed with an online system over time or user actions performed in real world that may be monitored by a system.

Analysis of time series data often includes forecasting future values of the time series based on historical data. Forecasting of time series data may be used for predicting potential issues with a system providing the underlying time series data. For example, if the time series data represents computer network usage, the time series forecasting may be used to predict potential network outages in advance. The time series data may represent user data, for example, data describing users of a health care system. The time series data may describe metrics such as average length of stay of a person in a medical facility. The time series data may represent admissions per thousand (APT) i.e., number of admissions out of a thousand persons who seek help at a facility.

The data may be classified into different types of time series based on the type of information being reported. For example, user data for health care facilities may be classified based on the type of condition for which the user seeks help at the facility. Time series data reported by servers may be classified based on the sources of data, the type of computing resource reporting the data, the type of event being reported and so on. As a result, a very large variety of time series may be reported by a data source.

The model generation module 130 may generate different types of models for time series data including: simple exponential smoothing (SES) models, Holt models, Holt-Winters models, ARIMA (auto regressive integrated moving average) models, Prophet models, and so on. The simple exponential smoothing model may use one smoothing factor. Holt's method employs an additional smoothing factor to account for the trend in the data. Holt-Winter's method introduces a third smoothing parameter that addresses seasonality in conjunction with the other two smoothing parameters. ARIMA (Autoregressive Integrated Moving Average) focuses on explaining the autocorrelation in the data, in contrast with the exponential smoothing model, which addresses trend and seasonality in the data. Thus, ARIMA strives to ensure stationarity in the data by integrating a differencing step when data show evidence of non-stationarity. The Prophet method is an additive regression model with four parts: a piecewise linear or logistic growth curve trend, a yearly seasonal component, a weekly seasonal component, and a user-provided list of holidays. There is no known model that can fit the variety of time series data that is available. Therefore, the model generation module 130 identifies the right model for a given time series based on the application that generated the time series data or based on a metric used to evaluate the model.

The client device 120 used by a user for interacting with the online system 100 can be a personal computer (PC), a desktop computer, a laptop computer, a notebook, a tablet PC executing an operating system, for example, a Microsoft Windows®-compatible operating system (OS), Apple OS X®, and/or a Linux distribution. In another embodiment, the client device 120 can be any device having computer functionality, such as a personal digital assistant (PDA), mobile telephone, smartphone, wearable device, etc.

The interactions between the client devices 120 and the system 100 are typically performed via network 116, for example, via the Internet. The network enables communications between the client device 120 and the online system 100. In one embodiment, the network 116 uses standard communications technologies and/or protocols. The data exchanged over the network can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 116 can also include links to other networks such as the Internet.

FIG. 1 and the other figures use like reference numerals to identify like elements. A letter after a reference numeral, such as "120a," indicates that the text refers specifically to the element having that particular reference numeral. A reference numeral in the text without a following letter, such as "120," refers to any or all of the elements in the figures bearing that reference numeral (e.g. "120" in the text refers to reference numerals "120a" and/or "120b" in the figures).

System Architecture

Figure 2:
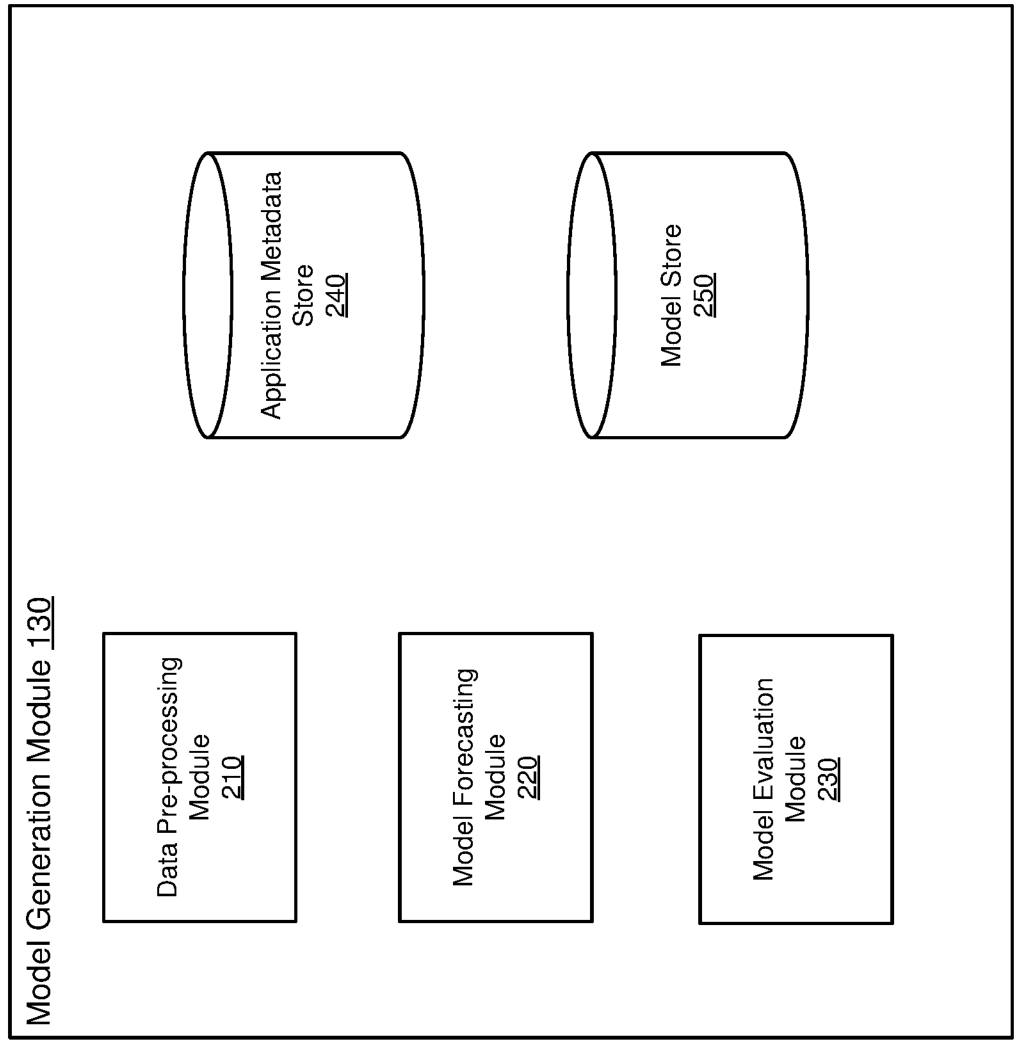
FIG. 2 shows the system architecture of the model generation, according to an embodiment.

FIG. 2 shows the system architecture of the model generation module, according to an embodiment. The system 100 comprises a data pre-processing module 210, a model forecasting module 220, a model evaluation module 230, an application metadata store 240, and a model store 250. Other embodiments may include other modules. Actions indicated as being performed by a particular module may be performed by other modules than those indicated herein.

The model store 250 stores models for various time series stored in the time series data store 160. A model comprises a set of parameters that are stored in the model store 250. The parameters of a model are adjusted using the training data during the training phase of the model. A model is associated with a set of instructions used for executing the model. The parameters of the model are processed using instructions specific to the model by the model execution module 140.

The application metadata store 240 stores a mapping from various application types to model metrics. A model metric represents a criterion for evaluating machine learning based models. A model metric represents a function or an expression used for determining a difference between data forecasted using a model with observed data (or labelled data). Examples of model metrics include MAPE (mean absolute percentage error), RMSE (root mean square error), MAE (mean absolute error), MSE (mean squared error), symmetric mean absolute percentage error (sMAPE), and so on. Accordingly, for an application for a specific application type, a specific model metric is used for evaluation of the models.

The data pre-processing module 210 performs various types of preprocessing of the time series data before it is used for training and evaluating the machine learning based models. The various types of pre-processing operations include, filtering data based on user defined upper and lower limits to identify a particular time frame for building the models, relabeling column names based on universal names acceptable for time series modeling, defining datatype prior to data splitting, and so on.

The model forecasting module 220 executes the machine learning based models using the time series data to perform forecasting so that the models can be evaluated for their performance. The model evaluation module 230 evaluates various models using a given metric that is appropriate for a particular business use case. The model evaluation module 230 selects the best model for forecasting a specific time series based on the evaluation. The selected model is stored in the model store 250.

The model generation module 130 may select a model M1 as the best model for metric q1 but another model M2 as the best model for a different metric q2, thus help us to find the most reasonable model based on a business use case. An application of a time series data may also be referred to as a use case of the time series data.

Overall Process

FIGS. 3-7 illustrated various processes for generating models for forecasting time series data according to various embodiments. The steps described herein for a process may be performed by modules other than those described herein. Furthermore, the steps may be performed in an order different from that shown herein, for example, certain steps may be performed in parallel.

Figure 3:
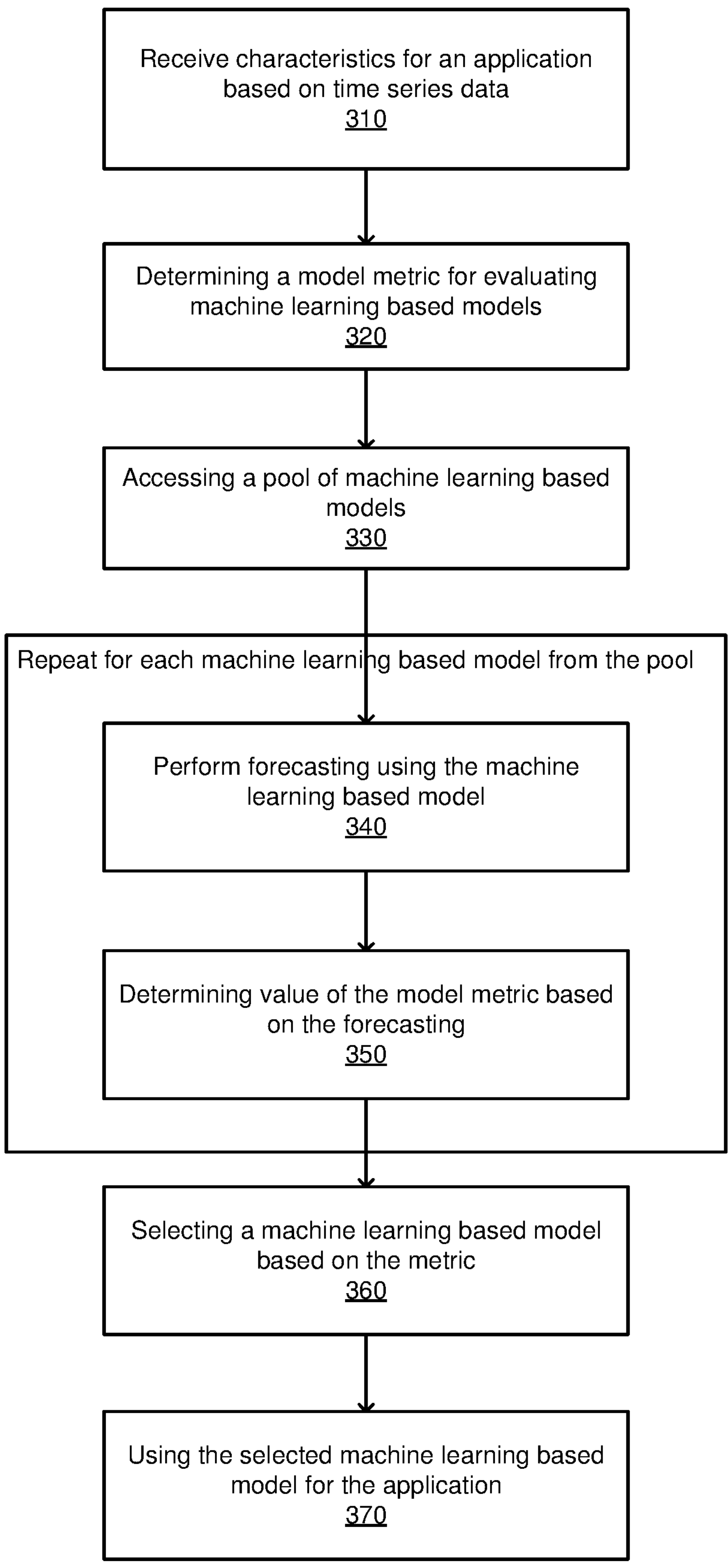
FIG. 3 shows a flowchart illustrating the overall process for selecting a model for forecasting time series data, according to an embodiment.

FIG. 3 shows a flowchart illustrating the overall process for selecting a model for forecasting time series data, according to an embodiment.

The model generation module 130 receives 310 characteristics of an application based on a time series data. The model generation module 130 determines a model metric based on the characteristics of the application. In an embodiment, the model metric is received from a user, for example, a system administrator. In some embodiments, the system receives the model metric from the user instead of the characteristics of the application and evaluates the models based on the received model metric. Accordingly, the user can directly specify the model metric that the user wants the system to use for evaluating the machine learning based models.

The model generation module 130 accesses a pool of machine learning models that includes multiple machine learning based models. The pool of machine learning models includes models based on a plurality of machine learning techniques, for example, simple exponential smoothing (SES) models, Holt models, Holt-Winters models, ARIMA (auto regressive integrated moving average) models, Prophet models, and so on.

The model generation module 130 repeats the steps 340 and 350 for each model selected from the pool of machine learning based models. The model generation module 130 performs 340 forecasting using each of the plurality of machine learning based models. The model generation module 130 determines 350 the value of the model metric for each of the plurality of machine learning based models based on the forecasting. The model generation module 130 may execute the steps 340 and 350 for different machine learning based models in parallel using a multi-processor architecture. For example, each model may be trained and evaluated by a different processor in parallel.

The model generation module 130 selects 360 a machine learning based model based on a comparison of a value of the model metric for the selected machine learning based model with one or more other machine learning based models from the plurality. The model generation module 130 uses 370 the selected machine learning based model for forecasting values for the time series data.

In an embodiment, the application metadata store 240 stores a mapping from categories of applications to model metrics. A category of application is determined based on the characteristics of the application or in most cases user defined. If the user is not able to specify the model metric, the metric is defined using an unsupervised clustering technique. This involves using the category of application along with the time series data and clustering the time series into pre-defined clusters using Dynamic Time Warping (DTW). Depending on the clusters that the time series is categorized into, the model metric is selected. The same method is also used to pre-define the clusters from a variety of time series data available along with appropriate metric selections to best select the metric based on the similarity of time series data. A new time series data is compared with the similar time series clusters using a distance measure within the model generation module 130 and a set of metrices may be selected. These can be then used as the model metric for the time series task. For example, the user may not have experience to select the metric for the specific time series data. In that scenario, the model generation module 130 will assign a set of metric based on the similarity of the time series with other existing time series clusters. The model metric is selected for a given application by determining the category of the application based on the characteristics of the application and selecting the model metric associated with the determined category of the application. For example, a characteristic of an application indicated whether outliers are significant for the given application. For example, an application attribute may represent a score representing a degree of significance of outliers for the application. The model generation module 130 may determine different categories of applications by taking a set of applications with known characteristics and cluster them based on their characteristics to determine a plurality of categories of applications. The model generation module 130 may cluster the applications using an unsupervised learning based technique (Dynamic Time Warping) that clusters feature vectors describing the applications. A new application is compared to the categories to determine the category of the new application. The model generation module 130 may determine the category of a new application by determining a distance measure between a feature vector describing the new application and feature vector describing various categories. The feature vector describing a category may be the feature vector of a centroid of the cluster of applications corresponding to the category. The model generation module 130 assigns the category that is determined to be most similar to the new application based on the distance metric or a similarity metric compared to the categories of applications. The model generation module 130 uses the model metric for the assigned category as the model metric for the application.

Figure 4A:
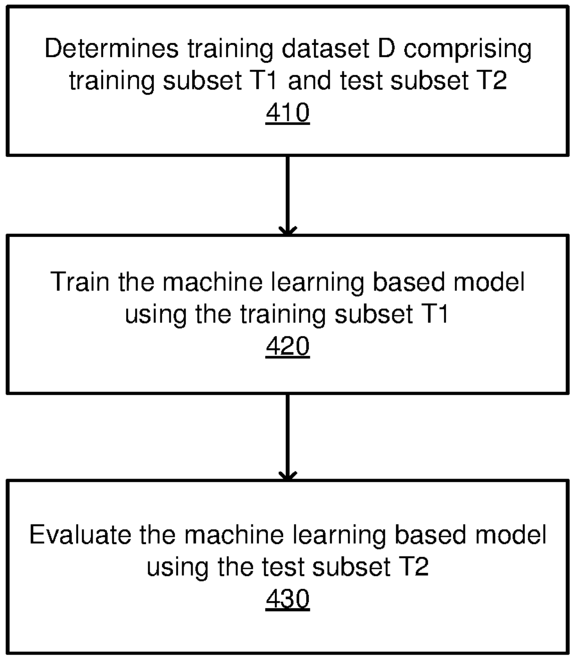
FIG. 4A shows a flowchart illustrating the process for training and evaluating a model for forecasting time series data using a training dataset, according to an embodiment.

FIG. 4A shows a flowchart illustrating the process for training and evaluating a model for forecasting time series data using a training dataset, according to an embodiment. The model generation module 130 determines 410 a training dataset, for example, training dataset D. The training dataset D includes a training subset T1 and a test subset T2. The model generation module 130 trains 420 the machine learning based model using the training subset T1. The model generation module 130 evaluates 430 the machine learning based model using the test subset T2.

Figure 4B:
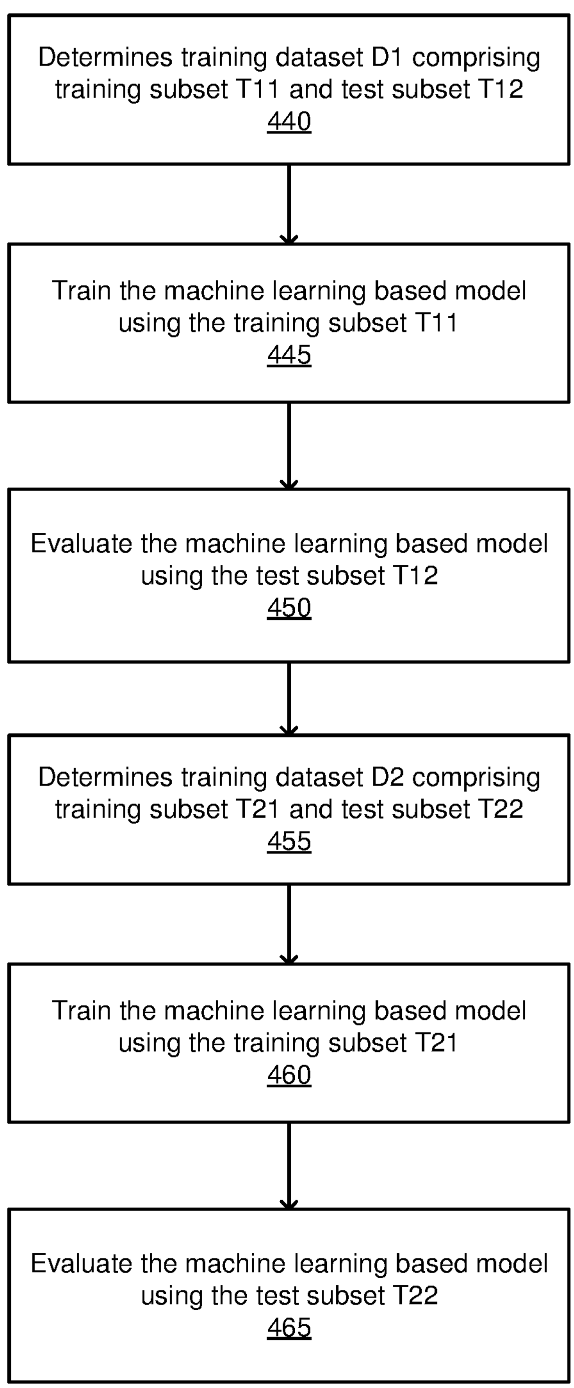
FIG. 4B illustrates the process for training and evaluating a model for forecasting time series data using two training datasets, according to an embodiment.

FIG. 4B illustrates the process for training and evaluating a model for forecasting time series data using two training datasets, according to an embodiment. The model generation module 130 determines 440 a training dataset, for example, training dataset D1. The training dataset D1 includes a training subset T11 and a test subset T12. The model generation module 130 trains 445 the machine learning based model using the training subset T11. The model generation module 130 evaluates 450 the machine learning based model using the test subset T12. The model generation module 130 further determines 455 a training dataset D2. The training dataset D2 includes a training subset T21 and a test subset T22. The model generation module 130 trains 460 the machine learning based model using the training subset T21. The model generation module 130 evaluates 465 the machine learning based model using the test subset T22.

Figure 5:
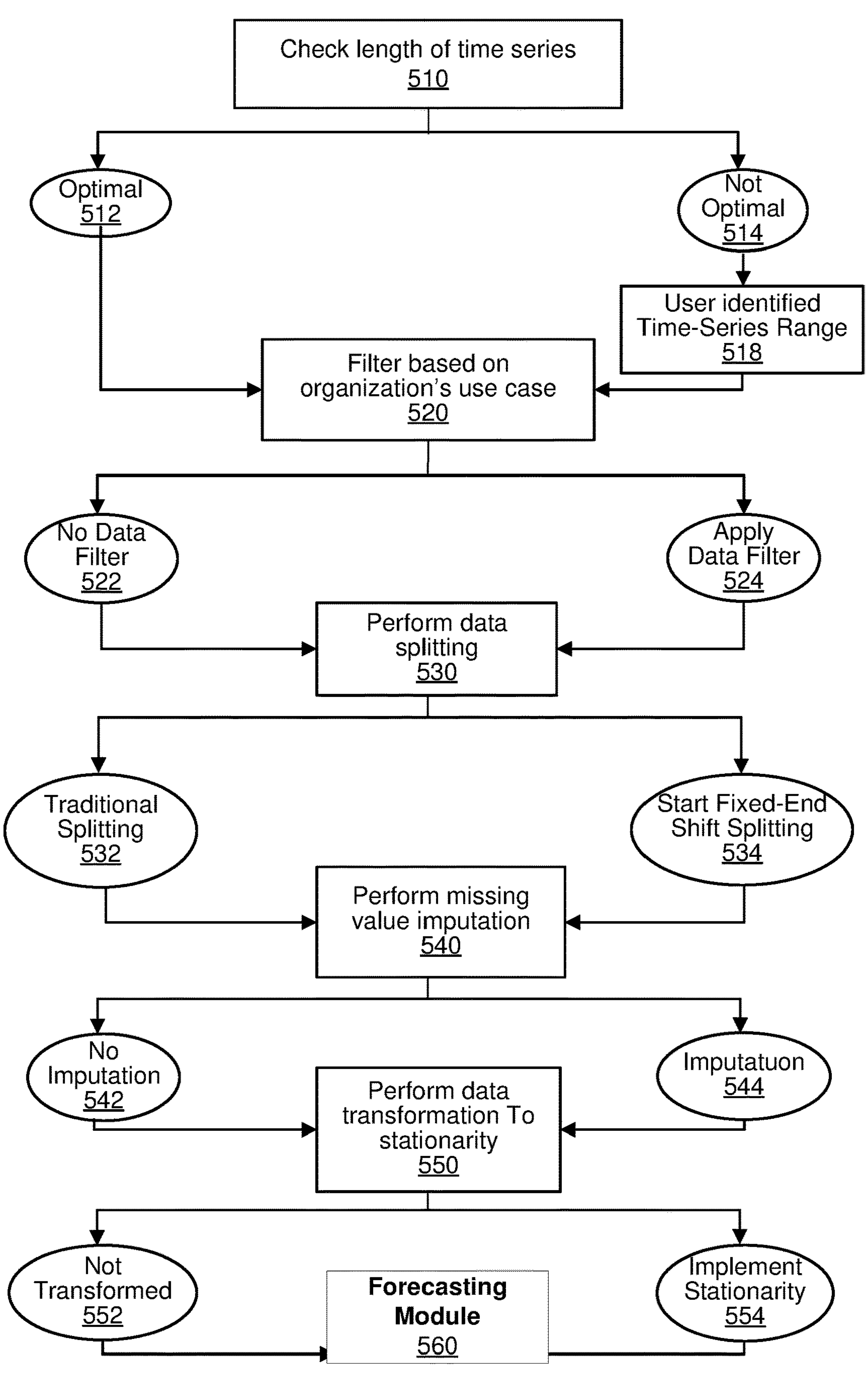
FIG. 5 illustrates the process of pre-processing of time series data, according to an embodiment.

FIG. 5 illustrates the process of pre-processing of time series data, according to an embodiment. The system receives time series data for a given application or use case. The system determines 510 the length of the time series and determines whether the amount of time series data is optimal 512 or not optimal 514. If the system determines that the amount of time series data is not optimal, the system receives 518 information describing the portion of the time series to be used for generating the models. The portion of the time series may be specified using an upper and a lower bound of the time values to select a range of time.

The time series data may include different types of values. The system receives description of a specific application or use case for which the forecasting is being performed. The system filters 520 the data based on the specified application to eliminate data of certain types that is not relevant for this application. Depending on the application, the system may apply a data filter 524 or apply no data filter 522.

The system may receive information on strategy for performing data splitting and determine whether to perform 532 traditional data splitting or to perform 534 data splitting based on user specified strategy. The data splitting strategy determines how to divide a training dataset into a training subset and a test subset. Details of the strategies for data splitting and using the data splitting strategies for efficiently selecting the machine learning based model for the user case are further described herein, for example, FIG. 7.

The system may perform 540 missing value imputation by using specific techniques to determine missing values based on other values that are available, for example, using mean. median, or mode values or use user defined default values. The system may decide to perform imputation 544 or not perform imputation 522.

The system may perform 550 data transformation for adjusting stationarity. The system may decide to transform 554 data to make it stationary or decide not to transform 552 data so that the data stays non-stationary. The preprocessed data is provided to the model forecasting module 220 for performing forecasting based on the time series data. The system may also relabel columns to allow data to be processed.

Figures 6A, 6B:
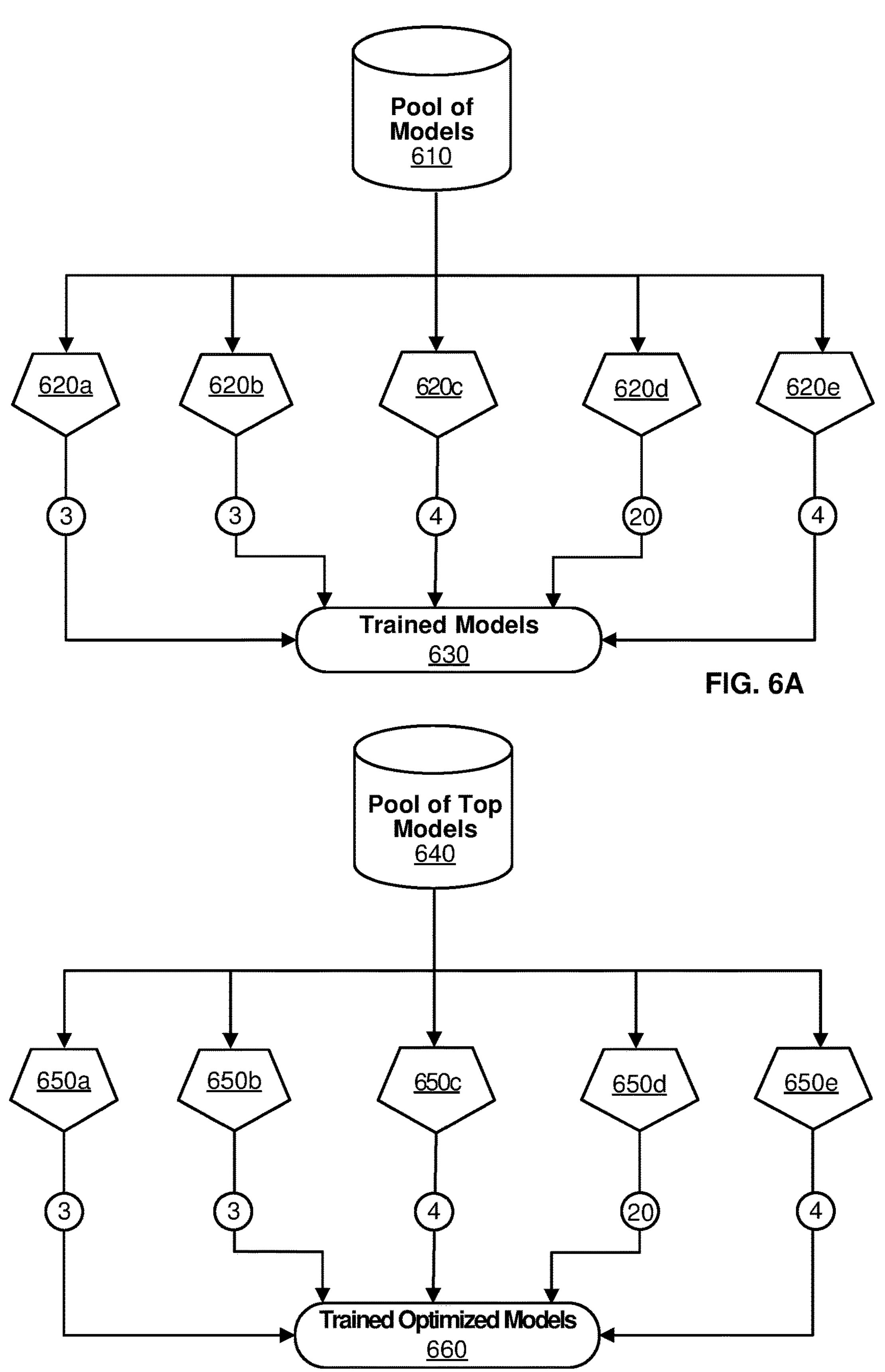
FIGS. 6A-B illustrate the process of training models from a pool of models, according to an embodiment.

FIGS. 6A-B illustrate the process of training models from a pool of models, according to an embodiment. FIG. 6A illustrates forecasting using machine learning based models from a pool of machine learning based models. The pool 610 of machine learning based models includes of machine learning based models based on different machine learning techniques. The pool 610 of machine learning based models may include multiple machine learning based models for each machine learning technique. For example, FIG. 6A shows a pool of machine learning based models including n1 machine learning based models using technique 620*a*, n2 machine learning based models using technique 620*b*, n3 machine learning based models using technique 620*c*, n4 machine learning based models using technique 620*d*, and n5 machine learning based models using technique 620*e*. As an example, the pool may include 3 machine learning based models using Holt, 3 machine learning based models using SES, 4 machine learning based models using Holt-Winters, 20 machine learning based models using ARIMA, and 4 machine learning based models using Prophet. The model generation module 130 trains all the models from the pool of machine learning based models to obtain a plurality of trained models 630.

In an embodiment, the model generation module 130 selects a top model of each machine learning technique. The top model is selected based on the model metric being used for evaluating the machine learning based models. Accordingly, the model generation module 130 determines a pool 640 of top machine learning based models, each using a different machine learning technique, for example, a top machine learning based model using technique 650*a* (e.g., Holt), a top machine learning based model using technique 650*b* (e.g., SES), a top machine learning based model using technique 650*c* using Holt Winters, a top machine learning based model using technique 650*d* (e.g., ARIMA), and a top machine learning based model using technique 650*e* (e.g., Prophet). The model generation module 130 further trains the top models from the pool 640 of top machine learning based models on the final training data 640 to obtain a plurality of trained top machine learning based models. The model generation module 130 evaluates the top machine learning based models to select the best machine learning based model based on the given model metric for the given application for forecasting based on the given time series data.

Figure 7:
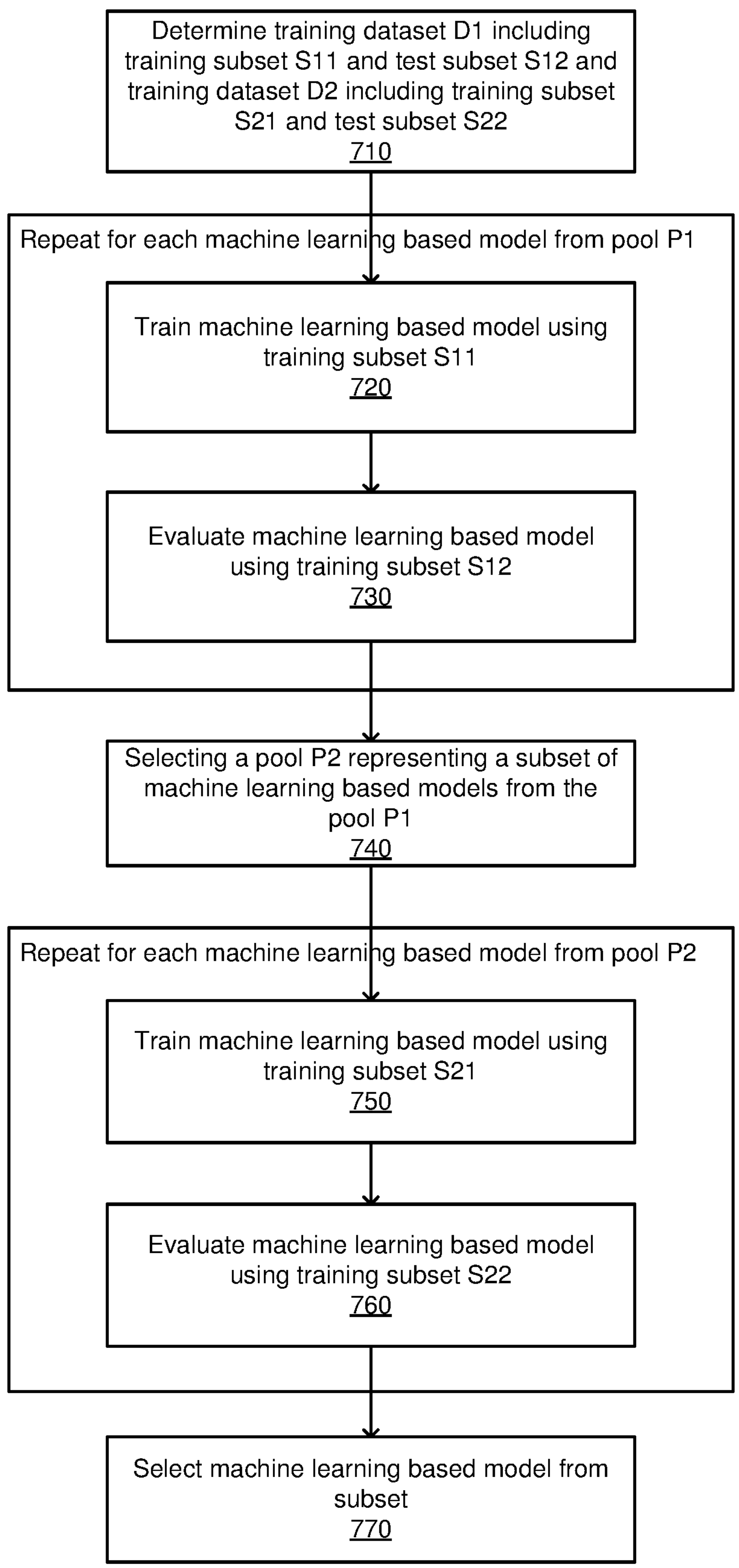
FIG. 7 illustrates the process of selecting a model from a pool of models for forecasting time series data, according to another embodiment.
Figure 8:
FIG. 8 illustrates the training data sets and their corresponding subsets, according to an embodiment.
Figure 8:
Figure 8:

FIG. 7 illustrates the process of selecting a model from a pool of models for forecasting time series data, according to another embodiment. The model generation module 130 accesses a pool P1 of machine learning based models, for example, pool 610. The model generation module 130 determines two training datasets D1 and D2. The training dataset D1 includes training subset S11 and test subset S12 and training dataset D2 includes training subset S21 and test subset S22. The training dataset D1 is smaller than the training dataset D2. Accordingly, the training subset S11 is smaller than the training subset S21 and the test subset S12 is smaller than the test subset S22. FIG. 8 illustrates the training data sets D1 and D2 and their corresponding subsets as described, according to an embodiment. In an embodiment, the training data set D1 acts as the primary training subset, whereas S21 of dataset D2 acts as the final training subset.

In some embodiments, D1 is a part of D2 and S11 (training) and S12(test) are 2 parts of D1. The system trains all machine learning models on S11 and evaluates their performance on S12. Based on the performance, the system selects top model from each pool. D1 or S11+S12 represents S21 of D2. If S11 and S12 are combined (which is equivalent to D1) S21 of D2 is obtained. Accordingly, S11+S12=D1=S21 The top models from each pool (selected based on the evaluation in previous round) is trained on S21, and the system evaluates their performance on S22. Based on the performance, the system selects the TOP model across all pools.

The model generation module 130 repeats the steps 720 and 730 for each machine learning based model using the training subset S11. The model generation module 130 trains 720 each machine learning based model from the pool P1 of machine learning based models using training subset S11. The model generation module 130 evaluates 730 each machine learning based model from the pool 610 of machine learning based models using the given model metric and using the test subset S12.

The model generation module 130 selects a subset of machine learning based models from the pool 610 to obtain a smaller pool P2. For example, the model generation module 130 selects at least one machine learning based model based on each machine learning technique to obtain pool 640.

The model generation module 130 repeats steps 750 and 760 for each machine learning based model from pool P2. The model generation module 130 trains 750 each machine learning based model from the pool P2 of machine learning based models using training subset S21. Accordingly, parameters of the models trained using the training dataset D1 are used and further trained using larger training dataset D2. The model generation module 130 evaluates 760 each machine learning based model from the pool P2 of machine learning based models using the given model metric and using training subset S22.

The model generation module 130 selects the best model for forecasting time series data for the given application or based on a given model metric from the pool P2 of machine learning based models.

The model generation module 130 may execute the steps 720 and 730 for different machine learning based models in parallel using a multi-processor architecture. Similarly, the model generation module 130 may execute the steps 750 and 760 for different machine learning based models of pool P2 in parallel. For example, each model may be trained and evaluated by a different processor in parallel.

The use of the process shown in FIG. 7 reduce the possibility overfitting of the selected machine learning based model. The system filters out models that are likely to perform better on the training dataset D2 as a result of overfitting but may not perform well on the smaller training dataset D1. Accordingly, the final model that is selected is less likely to have overfitting.

Traditional splitting relies on using a part of test data to hyper-tune model parameters. For smaller time series data capturing entire seasonality might be difficult. In the system, the entire test data is preserved, and a part of training data is used as hold out validation set for hyper-tuning model parameters. For example, particularly in case of limited data, where there is only 3 years of daily data, the model is built on 1 year and 9 months and the model parameters are hyper-tuned on the next 3 months, followed by the model retraining for the entire 2 years of training set. Next, the last 1 year is used as the test set. In general the data may be available for T time interval, wherein the T time interval is made up of a T1 time interval, followed by a smaller T2 interval, followed by a T3 time interval. The model is built on a T1 time interval that is a subset of the T time interval, the model parameters are hyper-tuned on the smaller interval T2 that follows T1 and the model retraining is performed using the entire interval formed by T1 and T2. The portion T3 of the time interval that is remaining is used as the test set. This reduces overfitting by validation on entire seasonal range which captures entire trend and seasonality available in the time series. A major advantage of this method over traditional cross-validation is that a more holistic training set is used which captures longer trends and seasonality.

Technological Improvements

Generating machine learning based models for the different types of time series data can be very cumbersome since several thousand lines of instructions may have to be specified by developers or other experts. Furthermore, training the machine learning based models may take months. Embodiments make the process of generating machine learning based models simplified and efficient. For example, the process that requires several thousand lines of code by conventional techniques can be executed using few lines of code, for example, four lines of code. Furthermore, instead of taking months of effort for building the models, the system performs an automated process that may be able to generate the appropriate models in hours or even several minutes, depending on the amount of time series data processed.

Furthermore, embodiments allow users to perform a time-series analysis on a wide variety of data. The system uses a pool of models that can be used across a wide variety of time series data, for example, normalized time-series data, time-series data without any extreme trend and/or seasonality, as well as time series data showing exponential growth. This robust workflow allows use of the system for any time-series forecasting across various applications that may be used across a large organization.

The system further allows faster execution as a result of parallel nature of the process. Use of multi-processor architectures allows the overall processing time to be significantly reduced. Furthermore, the process illustrated in FIG. 7 that filters out some of the models using a smaller training dataset improves the efficiency of execution by filtering out at an early stage a number of machine learning based models that need to be trained using the full training dataset.

Furthermore, since the system evaluates models based on a single model metric that is selected for a given application or use case, the system is able to generate the models more efficiently compared to systems that evaluate different metrics for each model. For example, a system that evaluates 5 different metrics for various models is likely to take five times the effort and resources compared to the system according to various embodiments as disclosed.

If the system uses different metrics for the time-series modeling, the system may determine different top model for different metrics. However, if the user specifies a specific model metric, for example, based on the use case, the system does not have to select across different models. For one model metric, the system determines a single one top machine learning model.

If users do not specify a particular model metric, for example, if the users do not have a specific use case to analyze, the system uses clustering technique to categorize metadata describing time series data from previously known applications. The system determines the ideal model metric for a specific time series data based on a distance metric indicating similarity of the metadata describing specific time series data with various categories obtained by the clustering process. This allows the system to automatically select a model from different models since there may be multiple top models while using different metrics.

Furthermore, the process illustrated in FIG. 7 results in selection of a machine learning based model that has less likelihood of overfitting. Accordingly, the techniques disclosed herein minimize overfitting of the machine learning based models selected. The selected model is likely to perform better with new data that is encountered at execution time compared to models that overfit the training data.

The system further improves the user experience for building models for a given application. The user can specify the input in few lines of code describing the type of application or use case or the type of metric to be used and the type of pre-processing to be performed. The system is able to build the model appropriate for the application based on minimal input from the user as compared to conventional systems that require the user to specify several thousand lines of code and spend significant amount of time and resources for building the model. Accordingly, the embodiments improve the user experience and provide an improved user interface to the users who want to build a machine learning based model for forecasting time series data for a specific use case or application. Furthermore, the user is not expected to have knowledge of the various types of machine learning based models and how to train and evaluate each type of machine learning based model. The user can simply provide domain information describing the use case and be able to build the right machine learning model for the user case.

Additional Considerations Embodiments

It is to be understood that the Figures and descriptions of the present invention have been simplified to illustrate elements that are relevant for a clear understanding of the present invention, while eliminating, for the purpose of clarity, many other elements found in a multi-tenant system. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Some portions of the above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A computer-implemented method for generating a machine learning based model for forecasting time series data, comprising:

receiving information describing characteristics of an application of a time series data;

determining a model metric based on the characteristics of the application, wherein determining the model metric comprises i.) generating a first feature vector describing the characteristics of the application; ii.) clustering a plurality of applications into a plurality of categories of applications by grouping similar applications with similar characteristics into a same category and generating a separate feature vector for each of the plurality of categories of applications wherein each separate feature vector describes the characteristics for its corresponding category; iii.) mapping the plurality of categories to at least one model metric for each category; iv.) comparing the first feature vector with the separate feature vectors to determine a distance measure between the first feature vector and each separate feature vector; v.) using the distance measures to select a category most similar to the application; vi.) determining a model metric associated with the most similar category to the application, wherein the model metric represents a criterion for evaluating machine learning based models;

accessing a plurality of machine learning based models, the plurality of machine learning based models comprising machine learning models based on a plurality of machine learning techniques;

training each of the plurality of machine learning based models using a first training dataset derived from the time series data;

evaluating each of the plurality of machine learning based models to determine a first value of the model metric for each machine learning based model;

filtering out a subset of the plurality of machine learning based models based on the first values of the model metric, wherein the subset comprises one or more top machine learning based models determined by comparison of the first values of the model metric for each of the plurality of machine learning based models;

training each machine learning based model in the subset of the plurality of machine learning based models using a second training dataset derived from the time series data, the second training dataset being larger than the first training dataset;

evaluating each machine learning based model in the subset using the second training dataset to determine a second value of the model metric for each machine learning based model in the subset;

selecting a best-performing machine learning based model for the application from the subset of the plurality of machine learning based models based on comparisons of the second values of the model metric; and using the selected machine learning based model for forecasting values for the time series data for the application.

2. The computer-implemented method of claim 1, wherein performing forecasting using each of the plurality of machine learning based models comprises:

determining the first training data set and the second training dataset based on the time series data, the first training data set comprising a first training subset and a first test subset, the second training data set comprising a second training subset and a second test subset;

wherein the second training dataset includes the first training dataset;

wherein the first and second training dataset comprise sequential time series intervals of the time series data and wherein each machine learning based model in the subset is trained using the data from a first time interval, then hypertuned using data from a smaller second time interval that follows the first time interval, and then tested using data from a third time interval that follows the first and second time intervals in order to reduce overfitting by validation on an entire seasonal range.

3. The computer-implemented method of claim 1, wherein the plurality of machine learning based models comprises sets of machine learning based models using different machine learning based techniques, the sets of machine learning based models including one or more of:

a set of machine learning based models based on simple exponential smoothing;

a set of machine learning based models based on double exponent smoothing technique; and a set of machine learning based models based on triple exponent smoothing technique; and a set of machine learning based models based on autoregressive integrated moving average; and a set of machine learning based models based on additive regression models.

4. The computer-implemented method of claim 1, wherein the model metric is one of:

mean absolute percentage error;

root mean square error;

mean absolute error;

mean squared error, or symmetric mean absolute percentage error.

5. The computer-implemented method of claim 1, further comprising:

training the plurality of machine learning based models using the first and second training datasets in parallel fashion across a multi-processor system.

6. The computer-implemented method of claim 1, wherein the plurality of machine learning based models comprises, a set of machine learning based models for each of the plurality of machine learning techniques, wherein selecting the machine learning based model comprises:

selecting a plurality of top machine learning based models, wherein each top machine learning based model is selected from a set of machine learning based models using a particular machine learning based technique; and selecting the best machine learning based model from the plurality of top machine learning based models.

* * * * *